United States Patent
Hwang et al.

(10) Patent No.: US 10,834,183 B2
(45) Date of Patent: *Nov. 10, 2020

(54) MANAGING IDLE AND ACTIVE SERVERS IN CLOUD DATA CENTERS (71) Applicant: International Business Machines Corporation, Armonk, NY (US)

(72) Inventors: Jinho Hwang, Ossining, NY (US); In Kee Kim, Charlottesville, VA (US); Christopher C. Young, Sleepy Hollow, NY (US); Sai Zeng, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/858,860

(22) Filed: Dec. 29, 2017

(65) Prior Publication Data
US 2018/0288143 A1    Oct. 4, 2018

Related U.S. Application Data (63) Continuation of application No. 15/472,374, filed on Mar. 29, 2017.

(51) Int. Cl.
*H04L 29/08* (2006.01)
*H04L 12/26* (2006.01)
*H04L 12/24* (2006.01)

(52) U.S. Cl.
CPC ...... *H04L 67/1031* (2013.01); *H04L 43/0811* (2013.01); *H04L 67/1004* (2013.01);
(Continued)

(58) Field of Classification Search
CPC ............ H04L 67/1031; H04L 43/0811; H04L 67/1004; H04L 41/5019; H04L 43/0876;
(Continued)

(56) References Cited

U.S. PATENT DOCUMENTS 6,347,339 B1 * 2/2002 Morris ................ H04L 43/0811
709/224
8,880,687 B1 * 11/2014 Chandrachari ....... H04L 43/065
709/224

(Continued)

OTHER PUBLICATIONS

Netanal Cohen et al., "Graph-based Cloud Resource Cleanup" (2015) The Interdisciplinary Center, Herzliya, Israel.
(Continued)

*Primary Examiner* — Kamal B Divecha
*Assistant Examiner* — Sujana Khakural
(74) *Attorney, Agent, or Firm* — JoAnn Crockatt; Otterstedt, Wallace & Kammer, LLP (57) ABSTRACT

A method, product, and apparatus for treating idle servers in a cloud system provide for extrapolating a purpose of each of a plurality of servers by comparing a list of processes active on the server to a plurality of lists of processes associated with a plurality of purposes; selecting vectors of idle/active features corresponding to the extrapolated purposes of each of the plurality of servers; classifying as idle or active each of the plurality of servers, by assessing the specified feature vectors using a linear support vector machine; validating as idle or active each server classified as idle, by assessing the connectivity of the server with all servers classified as active; and implementing at least one treatment option on servers that have been validated as idle. The treatment options may include terminating, terminating with snapshot, and stopping a virtual machine.

10 Claims, 8 Drawing Sheets

(52) U.S. Cl.
CPC ...... *H04L 41/5019* (2013.01); *H04L 43/0876* (2013.01); *H04L 67/02* (2013.01); *H04L 67/306* (2013.01)

(58) Field of Classification Search
CPC ....... H04L 67/02; H04L 67/306; G06F 9/445; G06F 2009/4557; G06F 11/3466
See application file for complete search history.

(56) References Cited

U.S. PATENT DOCUMENTS

| | | | | |
|---|---|---|---|---|
| 9,319,993 | B1* | 4/2016 | Urbanus | H04W 52/22 |
| 9,578,088 | B2* | 2/2017 | Nickolov | G06F 9/4856 |
| 2003/0177176 | A1* | 9/2003 | Hirschfeld | H04L 69/329 |
| | | | | 709/203 |
| 2006/0253728 | A1* | 11/2006 | Gemon | H04L 67/101 |
| | | | | 714/4.1 |
| 2011/0196968 | A1* | 8/2011 | Kobayashi | G06F 11/3409 |
| | | | | 709/226 |
| 2011/0213508 | A1* | 9/2011 | Mandagere | G06F 1/26 |
| | | | | 700/291 |
| 2014/0137112 | A1* | 5/2014 | Rigolet | G06F 9/5022 |
| | | | | 718/1 |
| 2015/0249615 | A1* | 9/2015 | Chen | G06F 9/45558 |
| | | | | 709/226 |
| 2015/0281113 | A1 | 10/2015 | Winder | |
| 2016/0239343 | A1* | 8/2016 | Holt | G06F 9/45558 |

OTHER PUBLICATIONS

Zhiming Shen et al., "Identifying Resources for Cloud Garbage Collection", 12th International Conference on Network and Service Management (CNSM) (2016) pp. 248-252, Montreal, QC, Canada.
NIST, The NIST Definition of Cloud Computing. Special Publication 800-145. Sep. 2011, pp. 1-7.
Jinho Hwang et al., unpublished U.S. Appl. No. 15/472,374, filed Mar. 29, 2017, Managing Idle and Active Servers in Cloud Data Centers, pp. 1-25 plus 8 sheets of drawings.
Paul J. Otterstedt, List of IBM Patents or Patent Applications Treated as Related, Jun. 25, 2018, pp. 1-2.

* cited by examiner

MANAGING IDLE AND ACTIVE SERVERS IN CLOUD DATA CENTERS

CROSS-REFERENCE TO RELATED APPLICATION

This application is a continuation of U.S. patent application Ser. No. 15/472,374, filed Mar. 29, 2017, the complete disclosure of which is expressly incorporated herein by reference in its entirety for all purposes.

BACKGROUND

The present invention relates to the electrical, electronic and computer arts, and more specifically, to managing servers within cloud data centers.

Private and hybrid clouds have become a common infrastructure for many enterprises to support their research and development activities and manage production servers to end users. Clouds are further discussed below. Based on a recent study from Stanford University, between 30%-35% of provisioned servers in cloud data centers are in idle state, not producing any useful work for any organizations. These idle servers consume huge operational costs for the owning enterprises. The number of idle servers worldwide is on the order of ten million, with up to thirty billion dollars in underutilized data center capital investment and electrical energy wastage of up to 40%.

SUMMARY

Principles of the invention provide techniques for managing idle and active servers in cloud data centers. In one aspect, an exemplary method includes extrapolating a purpose of each of a plurality of servers by comparing a list of processes active on the server to a plurality of lists of processes associated with a plurality of purposes. Further, the exemplary method includes selecting vectors of idle/active features corresponding to the extrapolated purposes of each of the plurality of servers. The exemplary method also includes classifying as idle or active each of the plurality of servers, by assessing the specified feature vectors using a linear support vector machine. Additionally, the exemplary method includes validating as idle or active each server classified as idle, by assessing the connectivity of the server with all servers classified as active. The exemplary method further includes implementing a treatment option on servers that have been validated as idle.

Other embodiments of the invention comprise a non-transitory computer readable medium that comprises computer executable instructions which when executed by a computer cause the computer to perform the method above discussed; and an apparatus that comprises a memory and a hardware processor that is operative to perform the method above discussed.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

Automated end-to-end server management based on lightweight inputs related to server utilization and configuration information.

Reduced management/operational costs in cloud data centers.

Increased performance of servers in data centers.

Increased capacity (server utilization efficiency) of cloud infrastructure.

Improved security (less zombie servers) in data centers.

These and other features and advantages of the present invention will become apparent from the following detailed description of illustrative embodiments thereof, which is to be read in connection with the accompanying drawings.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
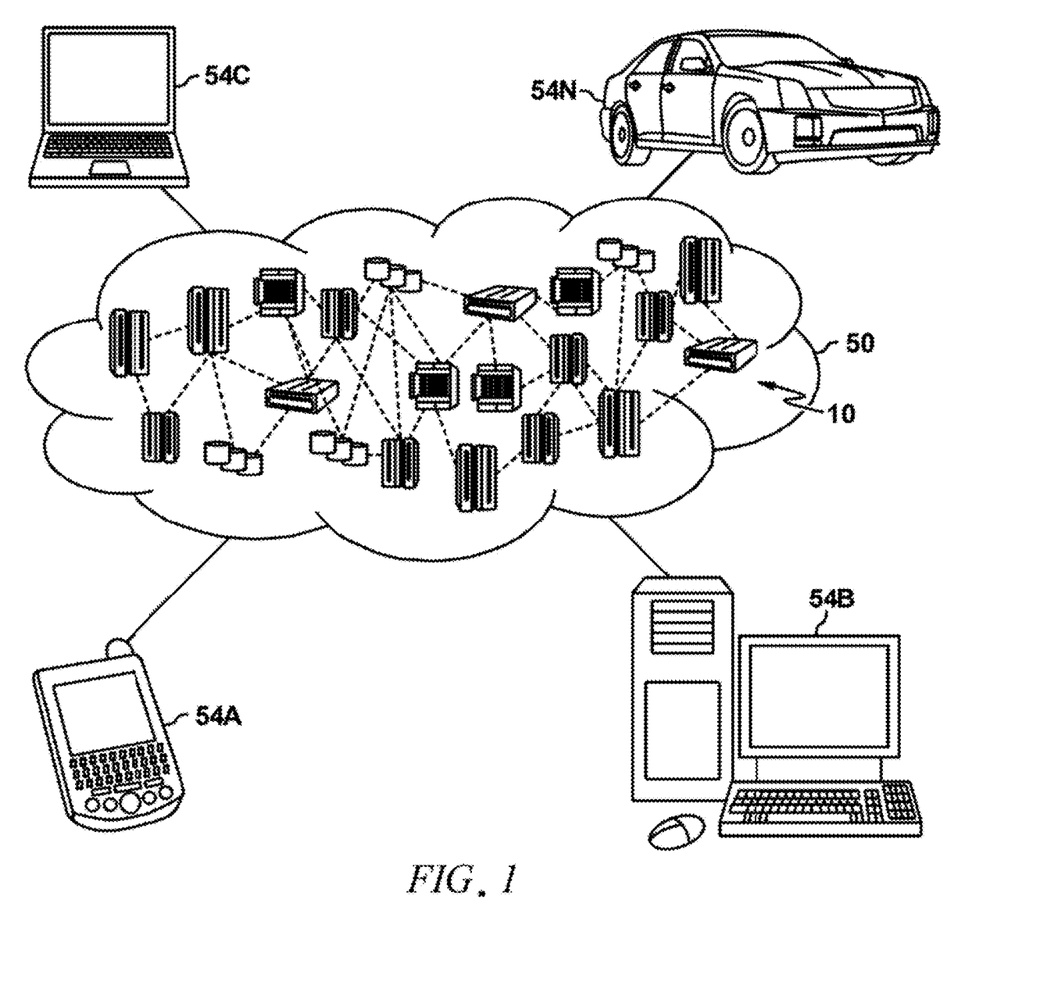
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
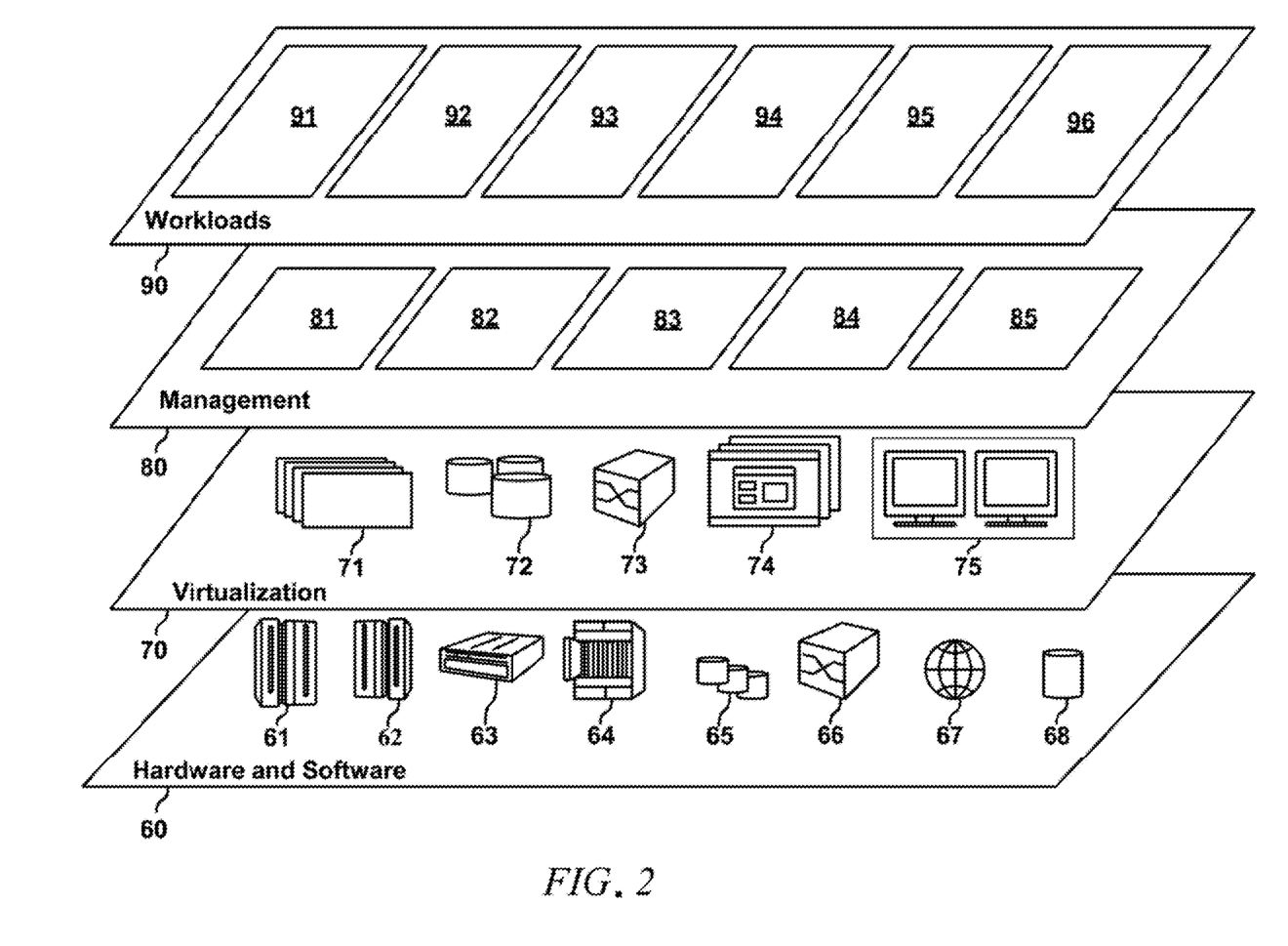
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a graphical user interface 96.

Figure 3:
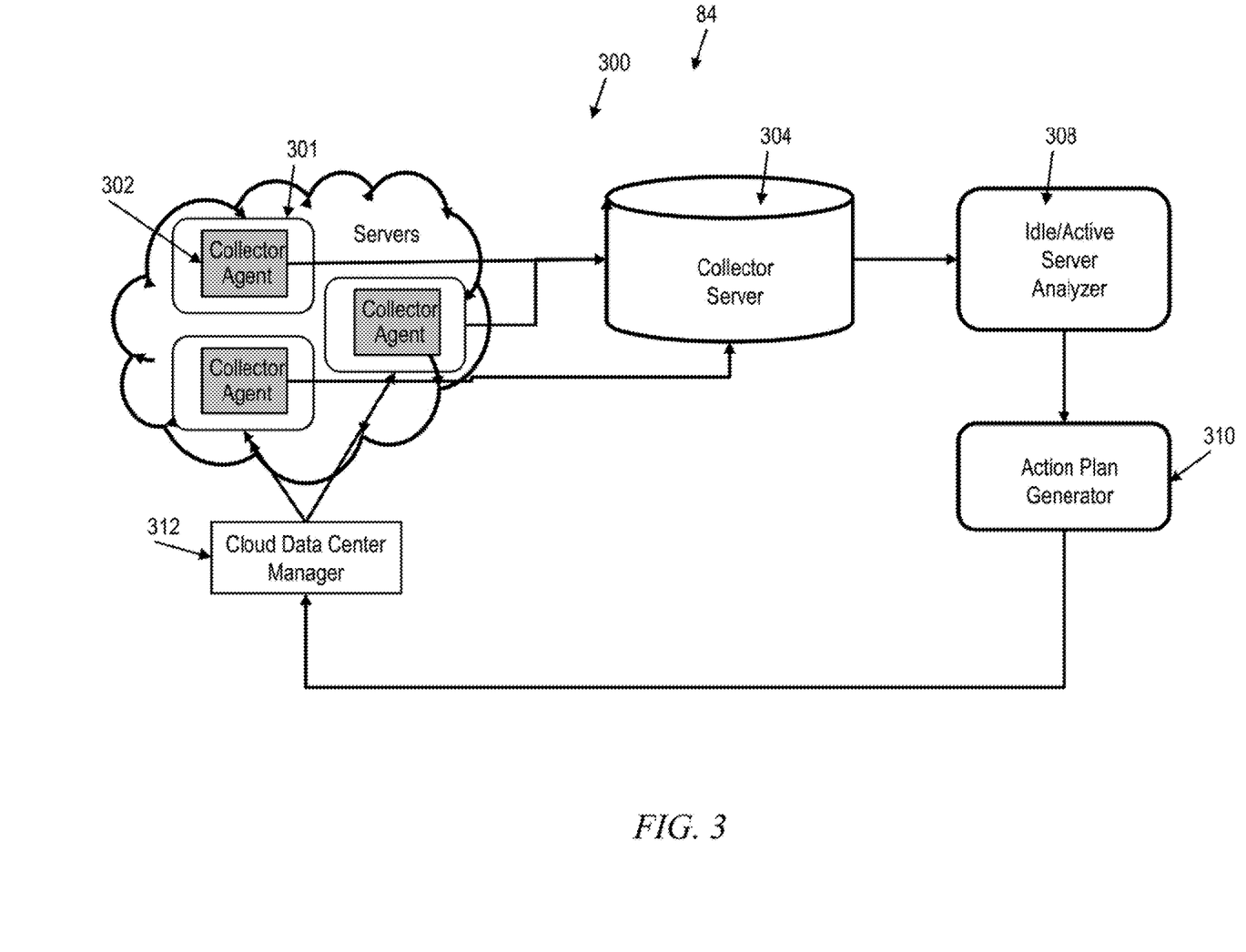
FIG. 3 depicts a system for managing idle and active servers in a cloud data center, according to embodiments of the invention.

Referring to FIG. 3, the service level management 84 implements a garbage collection system 300 for detecting and de-provisioning or terminating idle cloud servers 301. The garbage collection system 300 includes collector agents 302 that report to a collector server 304. The collector agents 302 crawl server usage information on individual cloud servers 301, including resource usage, login activities, and network connections.

The collector agents 302 run on each server 301 in cloud data centers (typically hundreds or thousands of cloud servers) and collect the following information in predefined time interval (e.g. executed in every four hours). Current running process: this information represents current process list running on target cloud servers. The collector agents 302 obtain this information by using "ps aux" command for Linux servers and "tasklist" command for Windows servers. Login activities: this information represents user login history. The collector agents 302 obtain this information through "last" command for Linux servers and a custom power shell script for Windows servers. Network Connections: this information provides current Transmission Control Protocol (TCP) connection information for target cloud servers. The collector agents 302 obtain this information via "netstat" command for both Linux and Windows servers. The collector agents 302 also may obtain other useful information such as Internet Protocol (IP) addresses, host name, and Input/Output (I/O) usage.

The collector server 304 stores historical time series information obtained from the collector agents 302, and passes the information to an idle/active server analyzer 308. The idle/active server analyzer 308 identifies idle servers based on information collected by the collector agents 302, and feeds the identifications to an action plan generator 310. The action plan generator 310 decides a proper management plan for idle servers as identified by the analyzer 308, and pushes the action plan to a cloud data center manager 312.

The cloud data center manager 312 de-provisions or terminates idle servers in response to the action plan.

Figure 4:
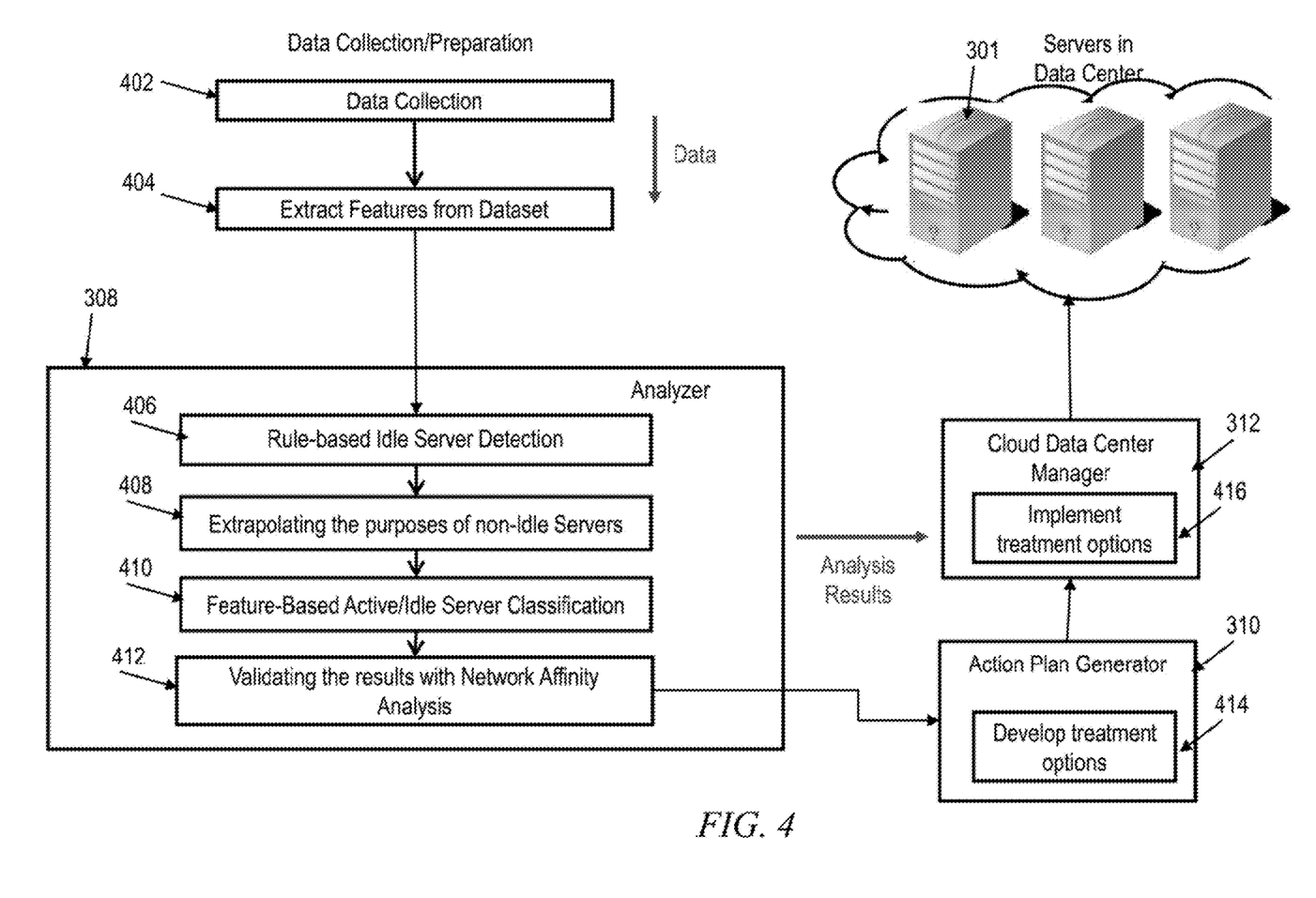
FIG. 4 depicts an algorithm for detecting idle and active servers in a cloud data center, according to embodiments of the invention.

FIG. 4 depicts an algorithm 400 that is implemented by the idle/active server analyzer 308, the action plan generator 310, and the cloud data center manager 312. The algorithm 400 includes data collection 402 (pushed from the collector server 304 to the idle/active server analyzer 308) as well as feature extraction 404. Data collection 402 includes current running processes, central processing unit (CPU) usage, login activity, memory usage, IP addresses, host name, I/O usage, etc. as necessary for extrapolating a server's purpose and classifying the server as idle or active, as further discussed below. Feature extraction 404 includes login frequency, average login hours, number of Secure Shell (SSH) connections, user activity processes, CPU usage, memory usage, open network ports depending on server purpose, etc.

The idle/active server analyzer 308 then performs rule-based idle server detection 406. The analyzer 308 will detect 406 target servers as idle if they satisfy conditionally the following rules:

Long running servers: this means the target servers had no management operations for long time (the analyzer consider a target server is long running server if the server is running longer than 6 months without any reboot processes). In private/hybrid cloud infrastructure, no management operations (e.g. patch and software update, regular system maintenance) for more than 6 months are not common situations for server management. Long running servers will be detected as idle servers.

No significant user processes: if the target server has no important or observable user process, then the server will be detected as an idle server.

No recent user login activities: if the target server has no user login activity over last three months, then the server will be detected as an idle server.

No recent established network connections: if the target server has not established any network connections over the last month, then the server will be detected as an idle server.

Next, the analyzer 308 extrapolates 408 the purpose of each non-idle server from its server usage information. Extrapolating is accomplished based on comparing running processes to a categorized list. For example, some processes are known to be analytics processes, some are storage processes, some are development processes, some are operations processes, and some are database processes. Other categories of processes are within the scope of the invention. Advantageously, server purpose discovery based on running process analysis provides a relatively lightweight (low CPU load) method for selecting what features to extract and assess at the next step.

Figure 5:
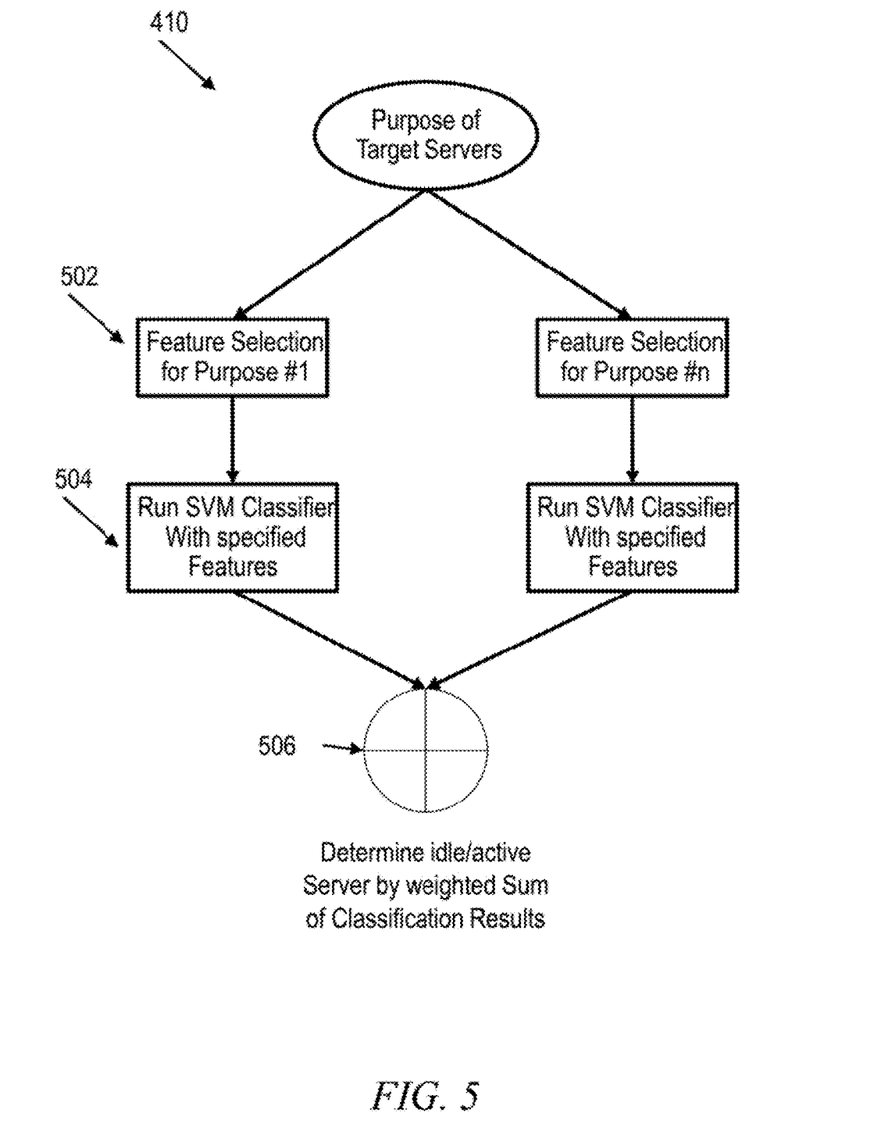
FIG. 5 depicts another algorithm for detecting idle and active servers in a cloud data center, according to embodiments of the invention.

According to the extrapolated purpose of each server, the analyzer 308 proceeds to a step of classifying 410 the non-idle servers as idle or active. Thus, a non-idle server (not detected as idle by rule-based idle server detection 406) may at this step be marked as idle. FIG. 5 shows details of an algorithm for classifying 410. First, based on the extrapolated purpose of a server, the analyzer 308 selects 502 features by which to classify the server as idle or active based on comparison of server usage information to empirical values. For example, we have discovered that for an analytics server, percentage of CPU cycles utilized, percentage of memory utilized, and the number of open ports will correlate to idle/active usage rate. For a DevOps server, the number of significant processes, the percentage of CPU cycles utilized by significant processes, the percentage of memory utilized by significant processes, and the number of established network connections will correlate to usage rate.

For a development server, the number of daytime logins, the average length of logins, the number of secure shells or virtual network connections, and the number of user activity processes will correlate to usage rate. Thus, features for classifying 410 are selected 502 based on what processes are running on each server. Advantageously, the inventive system and method provides a way to differentiate important/unimportant and idle/active servers based on the purpose and activities of each server.

Then, by comparing 504 each of the selected features to empirical thresholds we can determine 506 whether a server is idle or active. For example, we have discovered that an active analytics server has strong correlation with CPU usage greater and memory usage greater; an active development server has strong correlation with login frequency greater and has daytime login hours.

The comparison 504 is accomplished by a linear support vector machine (SVM), which is an optimal margin-based classifier with linear kernel. The linear SVM tries to find a small number of data points that separate all data points of two classes with a hyperplane. The linear SVM uses the coordinates of the hyperplane to determine whether a server is idle or active. Advantageously, use of the off-the-shelf linear SVM provides a simple and fast classification with training, and this is better off in the real-time system than other approaches (e.g., optimization) that often require iterative operation.

Referring again to FIG. 4, after classifying 410 each server as idle/active based on its extrapolated purpose and server usage information, the analyzer 308 proceeds to validate 412 the idle/active results through network affinity analysis of the idle servers to identify active server dependencies from the apparently idle servers.

Even when a server has been classified as "idle", the inventive system and method proceed to a further step of validating 412 each idle server's network affinity with active servers. The idea is that when an active server (A) depends on/or is connected with another server (B), then server (B) must be active. This rule is used mostly for servers that are part of a cluster system. This is because slave nodes in cluster system usually have fewer features to be determined as active server. However, slave nodes are very active in many cases, for example, as member nodes for big data analytics framework (e.g. Hadoop, Spark, or Mesos); or as a backup server for HA (High Availability) Cluster (e.g. Hot-Standby). The procedure for analyzing network affinity (validating 412 the server classifications) is as follows: Collect all network information (i.e. IP addresses and host names) of active servers that are determined by the prior step (linear SVM classifier). Check each idle server's netstat information to determine whether the idle server is connected in communication with any active servers. If yes, the idle server is re-classified as an active server.

The idle/active server analyzer 308 then pushes validated identifications of idle servers to the action plan generator 310. For each server classified as idle, the action plan generator 310 produces one of three treatment options: Termination in case the server is classified as completely idle with no significant processes; Termination with Snapshot in case the server is classified as idle with running storage/backup related processes (e.g., DBMS); or Stop Virtual Machine in case the server is classified as idle with other running processes. The action plan generator 310 pushes the treatment options to the cloud data center manager 312, which implements the treatment option that has been assigned to each idle server.

Figure 6:
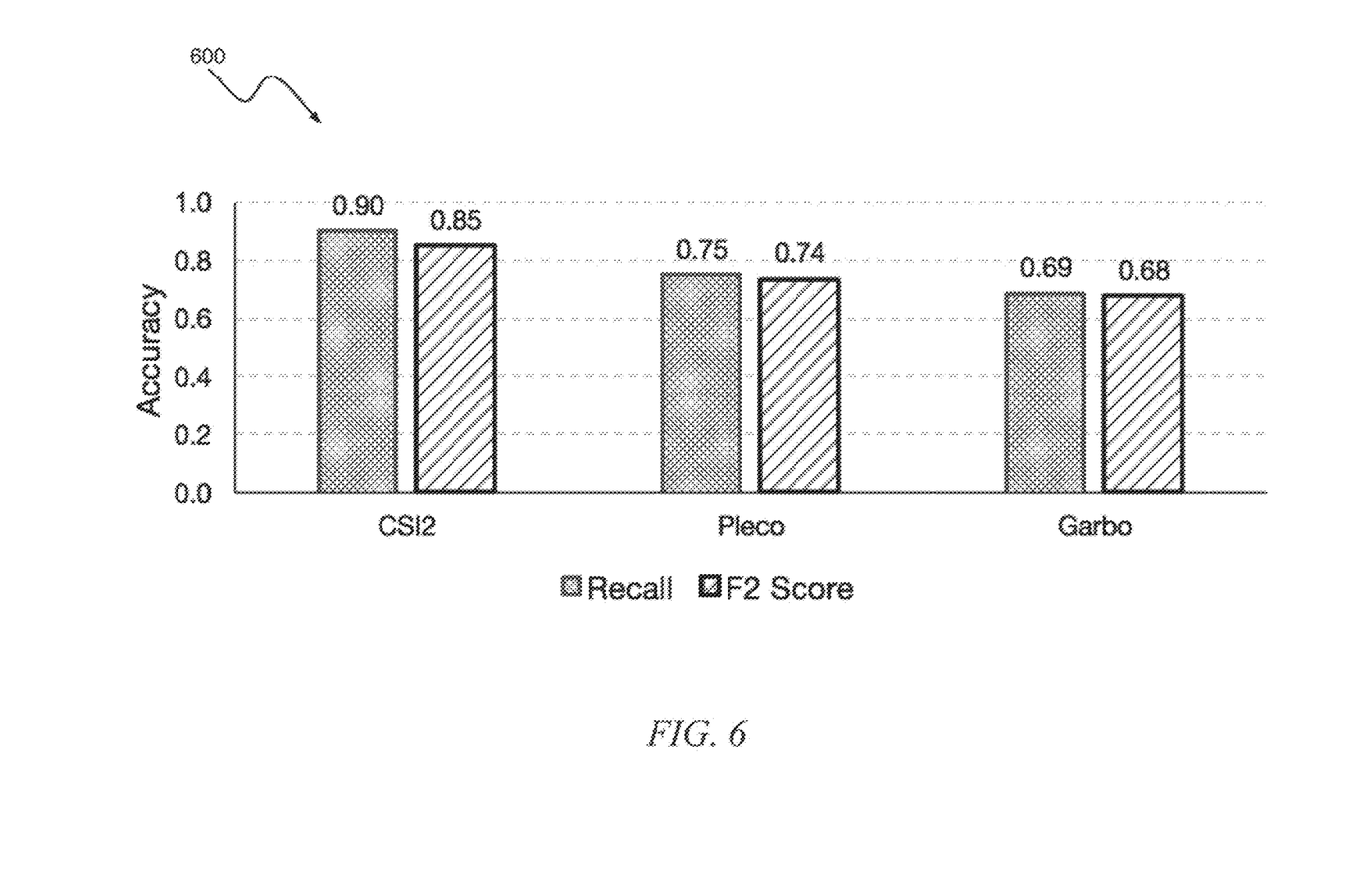
FIG. 6 depicts comparative experimental accuracy of the algorithms shown in FIGS. 4 and 5.

Thus, FIG. 6 depicts comparative experimental accuracy of the algorithms 600 shown in FIGS. 4 and 5. Notably, use of the linear support vector machine for classifying the servers as idle or active provides for an increased accuracy across three different server farms/test data sets. The accuracy (recall: fraction of relevant instances that are retrieved, F2 Score: a weighted average of precision and recall) is higher than prior arts: Pleco (reference model based approach), Garbo (graph based approach).

Figure 7:
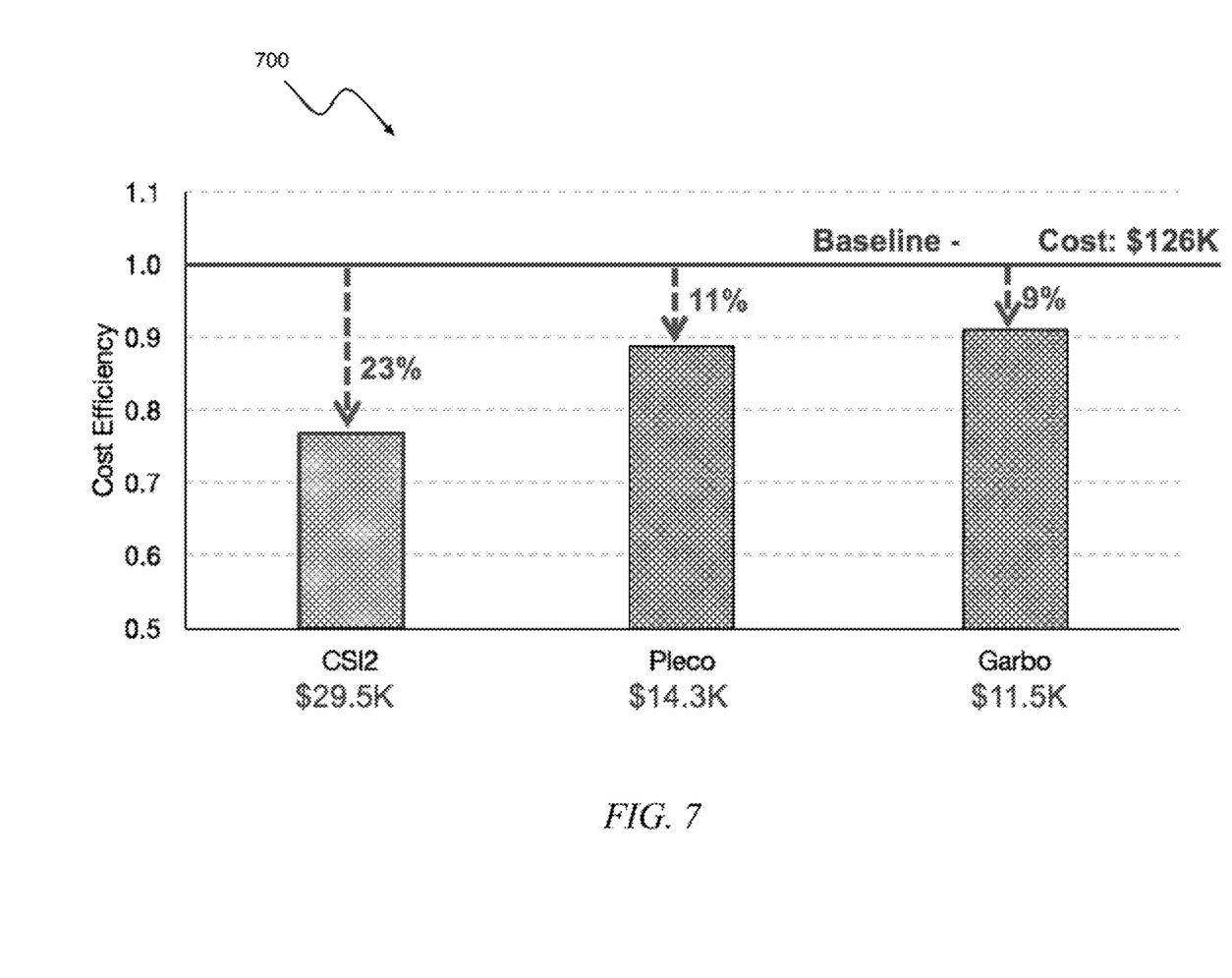
FIG. 7 depicts comparative experimental cost efficiency of the inventive system.

FIG. 7 depicts comparative experimental cost efficiency 700 of the inventive system. In particular, the invention provides for 9% to 23% cost reductions compared to a prior proprietary private cloud method for determining whether servers are idle or active. In other words, the enhanced accuracy of the inventive system ("CSI2") provides lower costs for operating idle servers, as well as lower costs for terminating active servers.

Given the discussion thus far, and referring again to the drawing Figures, it will be appreciated that, in general terms, an exemplary method, according to an aspect of the invention, includes Certain implementations of the exemplary method may also include performing rule-based detection 406 of idle servers, wherein the rules detect as idle servers that are long running, have no observable user processes, have no user login activities, or have no established network connections. For example, the rules may detect as active a server that has been running less than six months. As another example, the rules may detect as active a server that has had a user login within the past three months. As another example, the rules may detect as active a server that has had a network connection within the past month.

Certain implementations of the exemplary method include providing a system, wherein the system comprises distinct software modules, each of the distinct software modules being embodied on a computer-readable storage medium, and wherein the distinct software modules comprise an analyzer 308, an action plan generator 310, and a cloud data center manager 312. The extrapolating 408, the selecting 502, the classifying 410, and the validating 412 are carried out by the analyzer 308. The action plan generator 310 develops 414 treatment options for idle servers, and the cloud data center manager 312 implements 416 the treatment options. In certain implementations, the treatment options comprise terminating, terminating with snapshot, and stopping a virtual machine.

Other embodiments of the invention comprise a non-transitory computer readable medium that comprises computer executable instructions which when executed by a computer cause the computer to perform any of the methods above discussed; and an apparatus that comprises a memory and a hardware processor that is operative to perform any of the methods above discussed.

Figure 8:
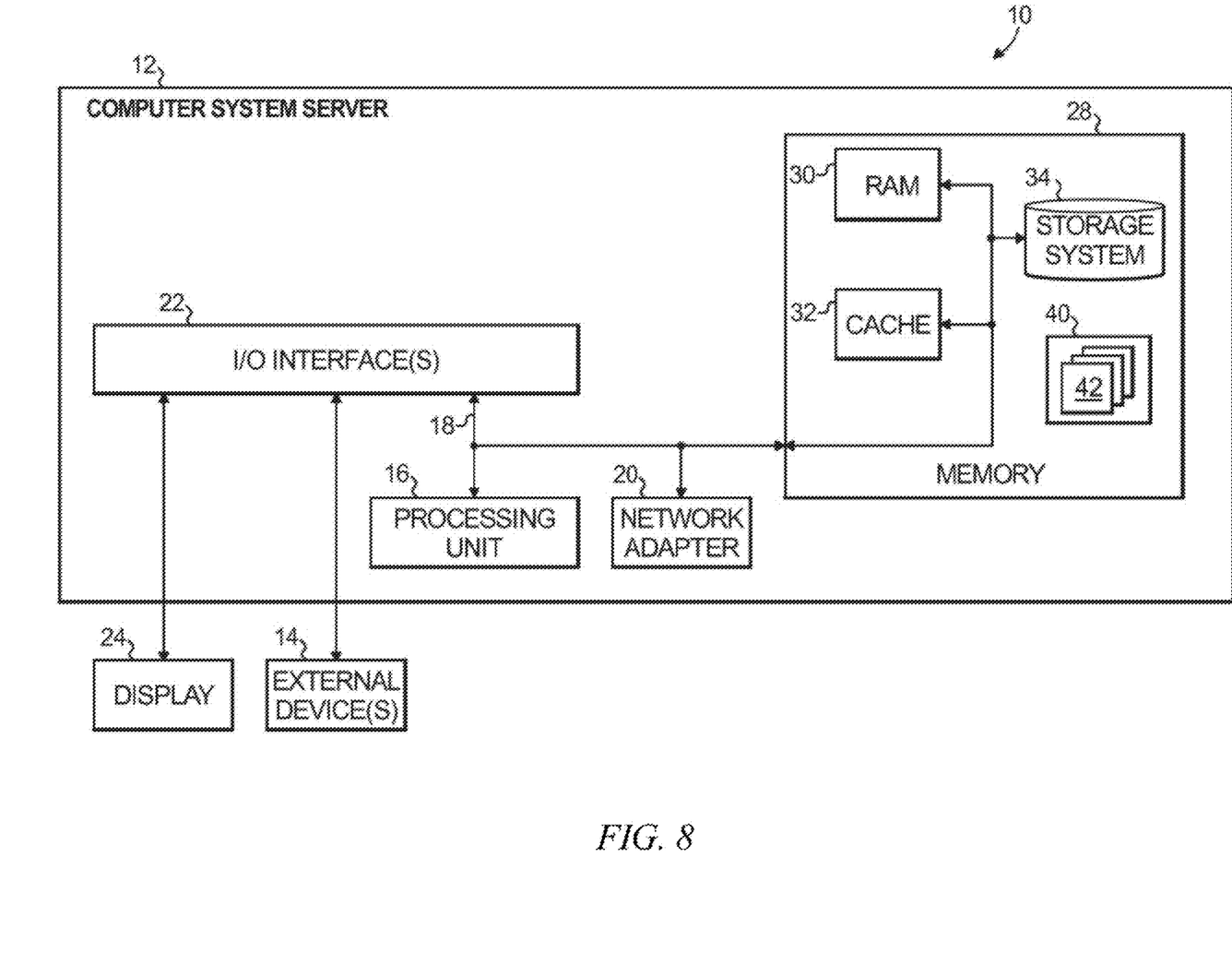
FIG. 8 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 8 depicts a computer system that may be useful in implementing one or more aspects and/or elements of the invention, also representative of a cloud computing node according to an embodiment of the present invention. Referring now to FIG. 8, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   extrapolating, by an analyzer executing on at least one hardware processor, a purpose of each of a plurality of servers by comparing a categorized list of processes active on each of the plurality of servers to a plurality of lists of processes associated with a plurality of purposes, wherein a list of processes active on each server is collected by at least one data collector agent running on the plurality of servers and the plurality of purposes include an analytics server, a DevOps server, and a development server;
   selecting, by the analyzer executing on at least one hardware processor, vectors of idle or active features corresponding to the extrapolated purposes of each of the plurality of servers, wherein:
      a first vector of idle or active features corresponding to the analytics server includes a first plurality of predetermined parameters that are specific to the operation of the analytics server;
      a second vector of idle or active features corresponding to the DevOps server includes a second plurality of predetermined parameters that are specific to the operation of the DevOps server, at least one of which is different from the first plurality of predetermined parameters; and
      a third vector of idle or active features corresponding to the development server includes a third plurality of predetermined parameters that are specific to the operation of the development server, at least one of which is different from the first and second pluralities of predetermined parameters;
   classifying, by the analyzer executing on at least one hardware processor, as idle or active each of the plurality of servers, by assessing the idle or active feature vectors corresponding to the analytics server, the DevOps server, and the development server using a linear support vector machine, wherein the linear support vector machine finds a plurality of data points that define a hyperplane that separates all data points of the idle or active feature vectors, and determines whether each server is idle or active based on coordinates of the hyperplane;
   validating, by the analyzer executing on at least one hardware processor, as idle or active each server classified as idle, by assessing the connectivity of each server classified as idle with all of the plurality of servers classified as active;
   developing, by an action plan generator executing on at least one other hardware processor, treatment options for idle servers; and
   implementing, by a cloud data center manager executing on at least one other hardware processor, at least one treatment option on servers that have been validated as idle, wherein the treatment option is selected from the list consisting of: terminating a virtual machine, terminating the virtual machine with snapshot, and stopping the virtual machine.

2. The method of claim 1 further comprising performing rule-based detection of an idle server among a plurality of servers, wherein the server is detected as one of long running, having no observable user processes, having no user login activities, or having no established network connections.

3. The method of claim 1 further comprising performing rule-based detection of an active server, wherein the rules are applied to detect as active a server that has been running less than six months.

4. The method of claim 1 further comprising performing rule-based detection of an active server, wherein the rules are applied to detect as active a server that has had a user login within the past three months.

5. The method of claim 1 further comprising performing rule-based detection of an active server, wherein the rules are applied to detect as active a server that has had a network connection within the past month.

6. A method comprising:
   extrapolating, by an analyzer executing on at least one hardware processor, a purpose of each of a plurality of servers by comparing a categorized list of processes active on each of the plurality of servers to a plurality of lists of processes associated with a plurality of purposes, wherein a list of processes active on each server is collected by at least one data collector agent running on the plurality of servers and the plurality of purposes include an analytics server, a DevOps server, and a development server;
   selecting, by the analyzer executing on at least one hardware processor, vectors of idle or active features corresponding to the extrapolated purposes of each of the plurality of servers, wherein:
      a first vector of idle or active features corresponding to the analytics server includes a percentage of CPU cycles utilized, a percentage of memory utilized, and a number of open ports;
      a second vector of idle or active features corresponding to the DevOps server includes a number of significant processes, a percentage of CPU cycles utilized by significant processes, a percentage of memory utilized by significant processes, and a number of established network connections; and
      a third vector of idle or active features corresponding to the development server includes a number of daytime logins, an average length of logins, a number of secure shells or virtual network connections, and a number of user activity processes;
   classifying, by the analyzer executing on at least one hardware processor, as idle or active each of the plurality of servers, by assessing the idle or active feature vectors corresponding to the analytics server, the DevOps server, and the development server using a linear support vector machine, wherein the linear support vector machine finds a plurality of data points that define a hyperplane that separates all data points of the idle or active feature vectors, and determines whether each server is idle or active based on coordinates of the hyperplane;
   validating, by the analyzer executing on at least one hardware processor, as idle or active each server classified as idle, by assessing the connectivity of each server classified as idle with all of the plurality of servers classified as active;
   developing, by an action plan generator executing on at least one other hardware processor, treatment options for idle servers; and
   implementing, by a cloud data center manager executing on at least one other hardware processor, at least one treatment option on servers that have been validated as idle, wherein the treatment option is selected from the list consisting of: terminating a virtual machine, terminating the virtual machine with snapshot, and stopping the virtual machine.

7. The method of claim 6 further comprising performing rule-based detection of an idle server among the plurality of servers, wherein the idle server is detected as one of long running, having no observable user processes, having no user login activities, or having no established network connection.

8. The method of claim 6 further comprising performing rule-based detection of an active server, wherein the rules are applied to detect the active server upon detecting that a server has been running less than a threshold time.

9. The method of claim 6 further comprising performing rule-based detection of an active server, wherein the rules are applied to detect the active server upon detecting that a server has had a user login within a predetermined time.

10. The method of claim 6 further comprising performing rule-based detection of an active server, wherein the rules are applied to detect the active server upon detecting that a server has had a network connection within a past temporal threshold.

* * * * *